Feb. 1, 1966     V. G. BELL, JR., ETAL     3,232,228
PORTABLE IMPRINTER
Original Filed Aug. 24, 1962     5 Sheets-Sheet 2
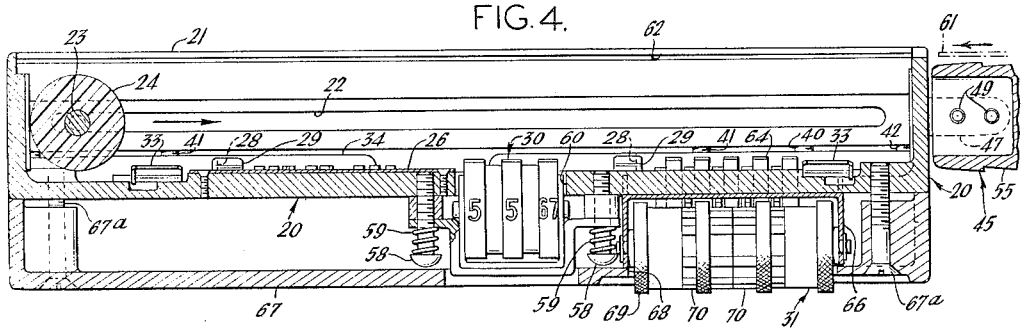
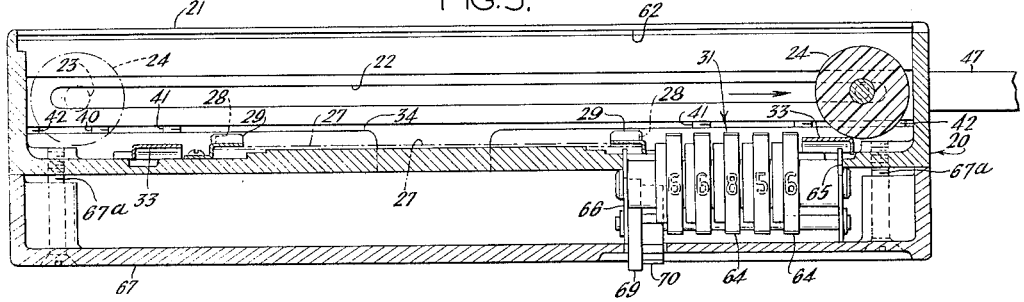
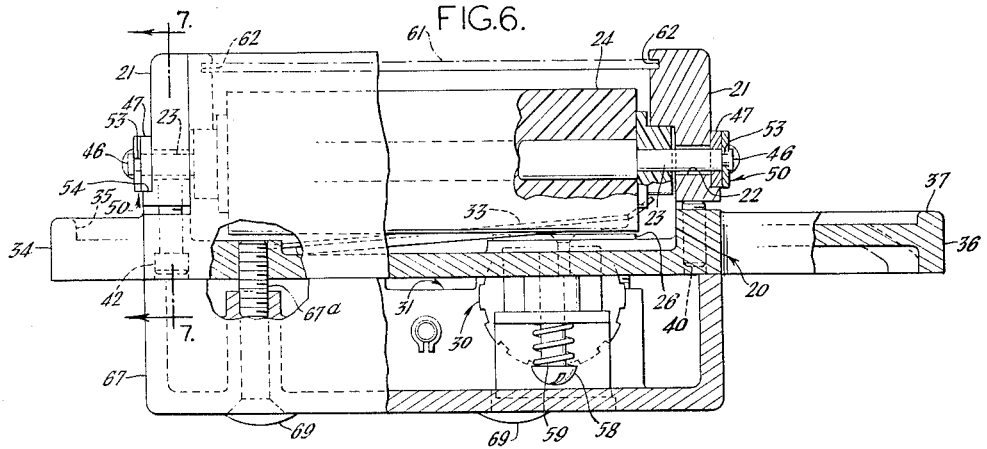
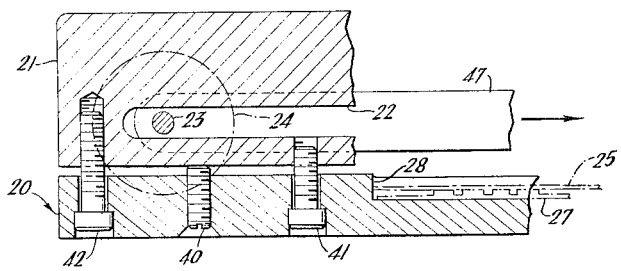
INVENTORS:
VINCENT G. BELL, JR.
ROY H. LINDBERG
BY Miketta, Glenny, Poms & Smith
ATTORNEYS.

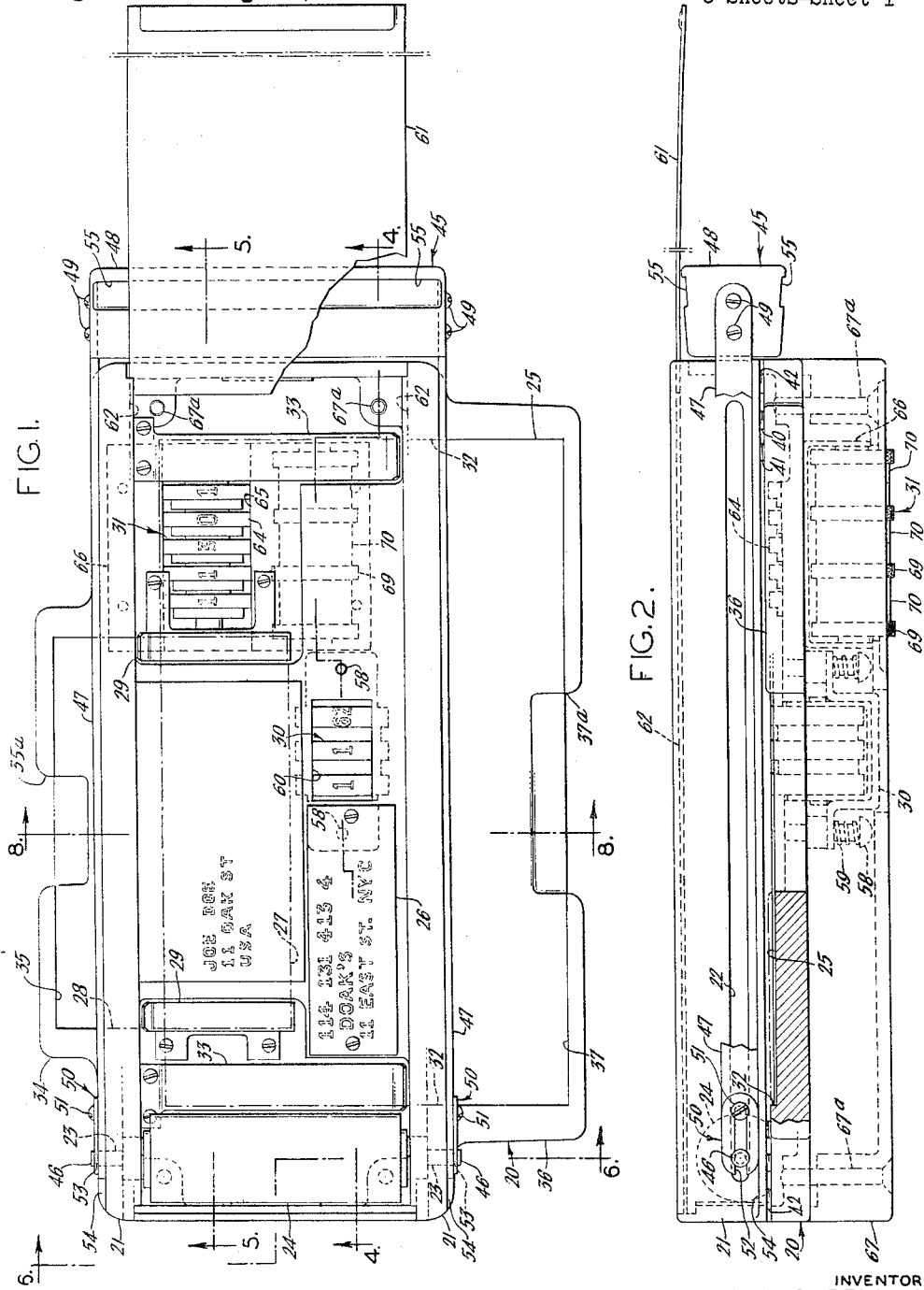

INVENTORS:
VINCENT G. BELL, JR
ROY H. LINDBERG

BY Mikulka, Slaney, Poms & Smith
ATTORNEYS.

Feb. 1, 1966 V. G. BELL, JR., ETAL 3,232,228
PORTABLE IMPRINTER
Original Filed Aug. 24, 1962 5 Sheets-Sheet 4
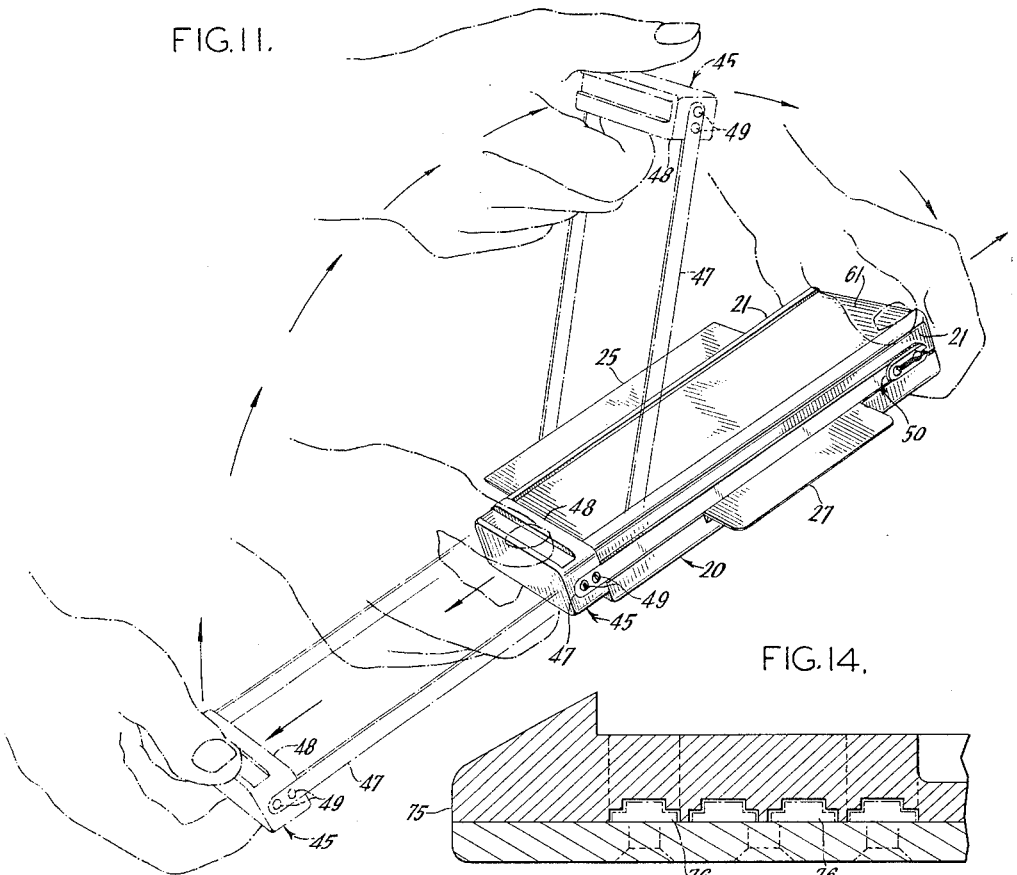
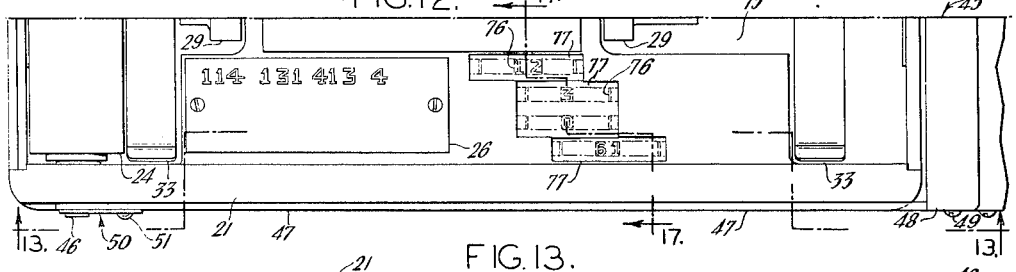
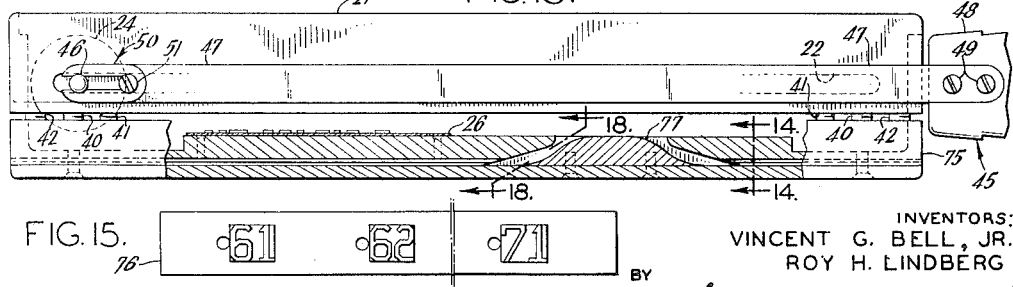
INVENTORS:
VINCENT G. BELL, JR.
ROY H. LINDBERG
ATTORNEYS.

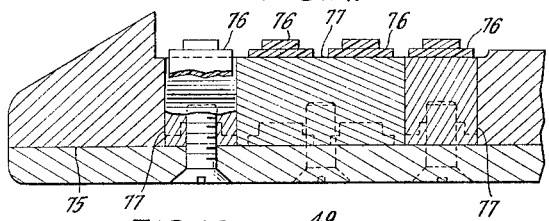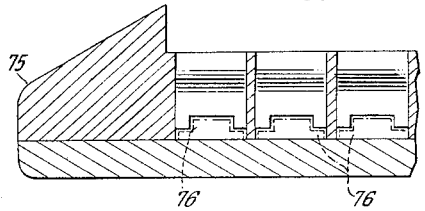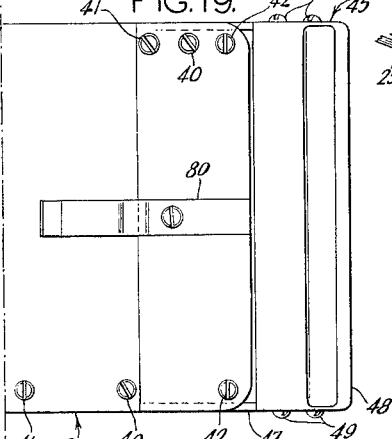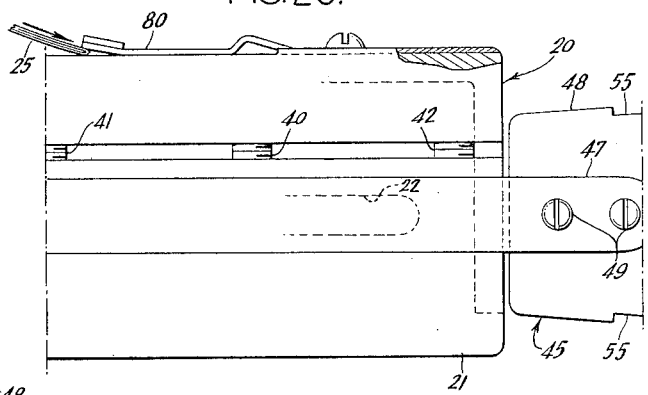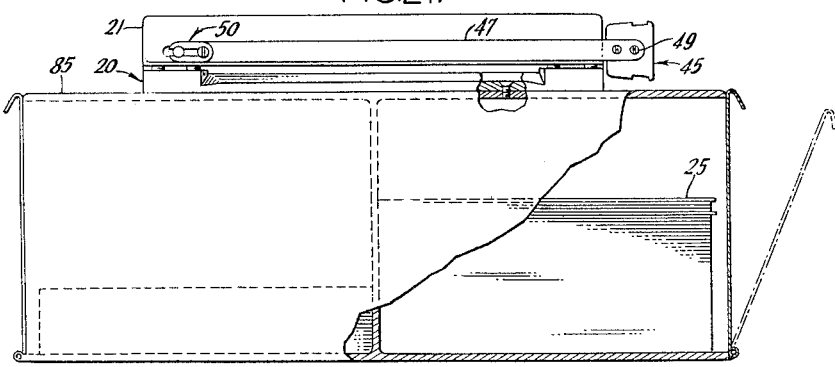

United States Patent Office 3,232,228
Patented Feb. 1, 1966

3,232,228
PORTABLE IMPRINTER
Vincent G. Bell, Jr., Wayne, Pa., and Roy H. Lindberg, Baldwin, Long Island, N.Y., assignors to Dashew Business Machines, Inc., Los Angeles, Calif., a corporation of Delaware
Continuation of application Ser. No. 219,206, Aug. 24, 1962. This application Feb. 12, 1965, Ser. No. 438,816
7 Claims. (Cl. 101—269)

This application is a continuation of our copending application Serial No. 219,206, filed August 24, 1962, now abandoned.

This invention relates to a portable imprinting device for recording indicia on a sales slip pad, as for a credit card and related impression elements, and has for an object the provision of improvements in this art.

The device in general is of the type in which indicia from impression elements, such as the raised impression elements of a credit card and other similar cards, fixtures, daters, and the like, are impressed on the sheets of a sales slip or ticket pad which is placed thereover when an impression or pressure roll is passed thereover. The printing on the sales sheets may be caused partly or wholly by carbon paper sheets placed above the sales slip pad sheets or may be caused partly by an ink-bearing pressure roll. It is a common practice to make a pressure roll which has a permanent ink impregnation which will serve for a long time before replacement or reimpregnation, such as impregnated roll serving for printing on the top sheet of a pad and carbon sheets causing printing on the under sheets.

The invention provides an improved casing which is simple and easy to make and assemble.

It provides a casing which is easy to adjust for proper roll pressure as may be desirable at times for impression cards of different thickness or pads of different thickness.

It provides a cover which can readily be removed for access to the interior and which will hold its position when closed.

It provides a casing with a smooth back or bottom on which to write, as for signing the sales slip or filling it out.

It provides a convenient handle for operating the pressure impression roll, the handle having a pull bar and side rods which can be swung over the casing and stowed at either end after use, and the casing and handle having interrelated parts for holding the handle assembly stowed within the depth of the casing.

It also provides improved dating means.

It also provides improved card and sales pad holding means, part of the holding means including tray-like projections or aprons on the sides of the casing.

It also provides improved means for showing amounts on digit wheels which are readily resettable by hand.

It also provides means for holding a supply of sales slips and serving for use on a fixed mounting when portability is not desired.

The objects as well as various features of novelty and advantages will be apparent from the following description of certain exemplary embodiments of the invention, in which in the drawings:

FIG. 1 is a top plan view, parts being broken away in places, of one embodiment of the invention;

FIG. 2 is a side elevation and section of the device shown in FIG. 1;

FIG. 3 is a side elevation of a cover for the device;

FIG. 4 is a vertical longitudinal section taken on the line 4—4 of FIG. 1;

FIG. 5 is a vertical longitudinal section taken on the line 5—5 of FIG. 1;

FIG. 6 is an enlarged transverse section and elevation taken on the line 6—6 of FIG. 1;

FIG. 7 is a partial vertical longitudinal section taken on the line 7—7 of FIG. 6;

FIG. 11 is a perspective view showing the operation of the roll actuating mechanism;

FIG. 12 is a top plan view of a part of a modified embodiment having a different dating mechanism;

FIG. 13 is a vertical longitudinal section taken on the line 13—13 of FIG. 12;

FIG. 14 is an enlarged transverse vertical section taken on the line 14—14 of FIG. 13;

FIG. 15 is an enlarged plan view of one of the dating strips which is partly shown in FIG. 12;

FIG. 16 is a side elevation of the strip shown in FIG. 15;

FIG. 17 is an enlarged transverse vertical section taken on the line 17—17 of FIG. 12;

FIG. 18 is an enlarged transverse vertical section taken on the line 18—18 of FIG. 13;

FIG. 19 is a partial back plan view of a simple form of the device;

FIG. 20 is a side elevation of the parts shown in FIG. 19; and

FIG. 21 shows the simple device of FIGS. 19 and 20 mounted on a base which provides storage space for ticket pads.

Figure 8:
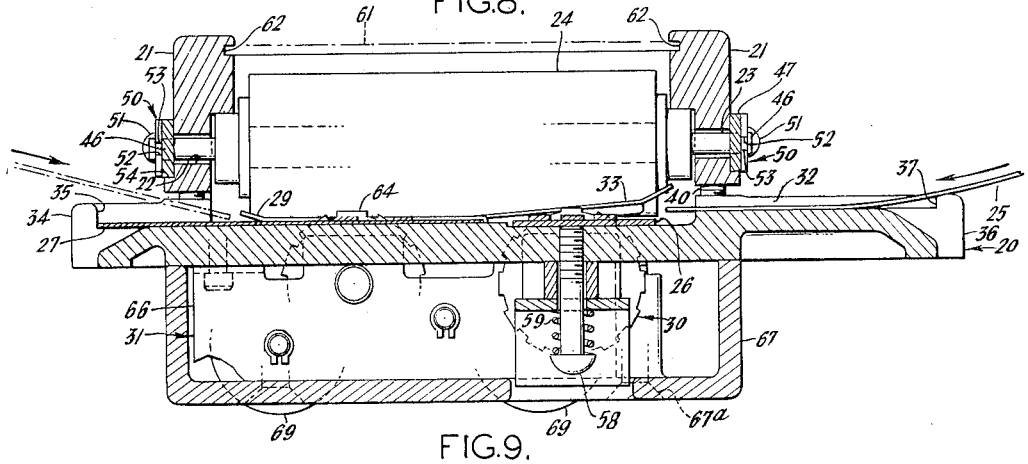
FIG. 8 is an enlarged transverse vertical section taken on the line 8—8 of FIG. 1.
Figure 9:
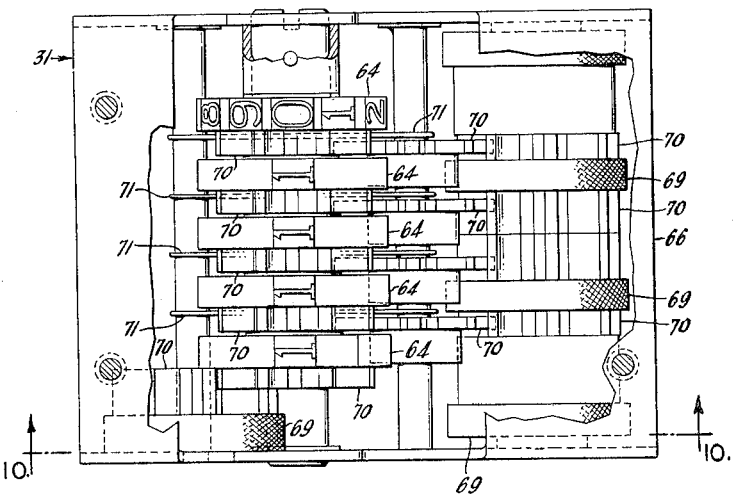
FIG. 9 is an enlarged partial plan view of one end of the device, parts being broken away in places.
Figure 10:
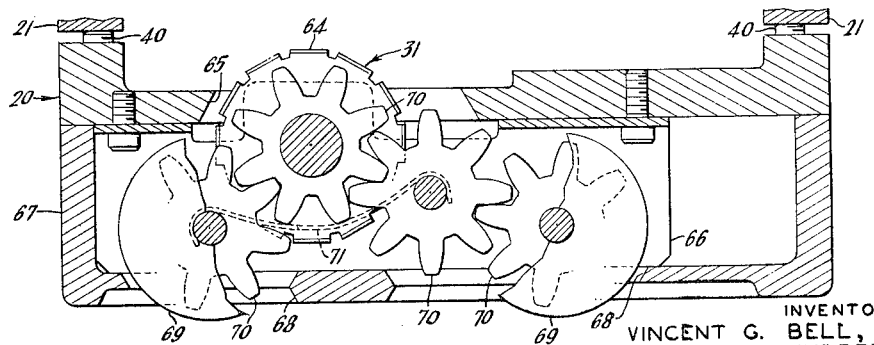
FIG. 10 is a transverse vertical section taken on the line 10—10 of FIG. 9.

The imprinting device herein illustrated comprises a casing having a base 20 of suitable plastic or metal, cast aluminum being one satisfactory material, and side rails 21 having elongated slots 22 for the guidance of the ends of a transverse shaft 23 of a pressure impression roll 24. If the duty requires, this may be an ink-impregnated roll which will print on the top sheet of a pad 25 of tickets, sales slips or the like.

The roll 24 is moved back and forth over the pad which is disposed above printing elements of selective nature and location on the platen bed of the base 20. By way of example herein, there is shown a dealer's plate 26, which may be permanently attached, a customer's card 27 which is inserted from one side through a slot space 28 (here between the base and side rail) and retained by spring clips 29, a settable dating stamp unit 30 which per se is of a known type, and an amount printing unit 31 which is settable by the operator for each transaction.

When the impression roll moves over a ticket pad with the roll shaft ends held down in the guide slots 22 it will cause the raised type elements of all of the several printing units to print the prepared indicia on all sheets of a pad disposed thereover, carbon paper sheets being used for lower sheets of a pad in the well-known manner. The pad 25 may be inserted through a slot space 32 (here between the base and the other side rail), spring clips 33 holding the pad in place.

For more secure and exact placement of the customer's card an apron or tray 34 is secured to the base on the proper side, the apron having a raised peripheral edge flange 35 which closely fits the outer edges of the card, the tray having a cut-out finger grip gap opening 35a; likewise an apron or tray 36 on the other side has a raised peripheral edge flange 37 for holding the outer edges of the ticket pad, the tray having a cut-out finger grip opening 37a.

Means are provided for adjusting the rails 21 relative to the base 20 to accommodate pads of different thickness or printing elements of different height. The means herein shown provides separate adjustment for each side and for each end in order to align the roll shaft axis with the bed or platen, more precisely, with the upper ends of the type or printing elements and to adapt to some extent to different heights of type which may exist between the two ends of the base. As here shown (FIG. 7), adjusting screws are provided in pairs, one screw 40 of each pair being threaded in the base and having its end abutting the bottom surface of a rail to act as a stop and the other screw 41 of a pair being free to turn in a hole in the base but threaded in the rail for clamping the rail and base together after the distance has been set by the screw 40.

Other screws 42 at the corners also secure the base and rails together and also serve other purposes of attachment, as will be seen.

Means are provided for moving the roll from end to end of its stroke, one stroke or passage being all that is necessary for each imprinting operation and the roll being alternately left at opposite ends of its travel. The length of the slots 22 fixes the length of stroke and the end positions of the strokes. As shown herein, a handle or bail 45 is turnably secured to the extended reduced end projections 46 of the roll, the handle including side rods 47 and a transverse hand grip bar 48 secured to the outer ends of the rods 47, as by screws 49. The rods 47 are flat and have holes embracing the shaft projections 46. Latch clips 50 pivoted to the rods 47 by pins 51 have side slots or notches 52 embracing the extensions 46 within annular grooves 53 to hold the rods on the roll ends.

The rods 47 lie closely alongside the side rails 21 and when the handle is not in use it is stowed in a position embracing the sides of the body of the casing of the imprinter, the rods being of such length that when the roll shaft is at one end of the slot the bar of the handle fits closely against the other end of the casing. Longitudinal shoulders or ribs 54 on the sides of the rails hold the handle rods in stowed position. By this arrangement the handle is stowed entirely between the upper and lower planes of the casing where it is completely out of the way, which makes the device very convenient to handle.

The shoulders 54 also serve another purpose and that is to guide the longitudinal movement of the handle so the roll shaft is held square across the platen. As shown, the bar of the handle is made relatively thick longitudinally of the handle and casing and is provided with finger engaging elements, here grooves 55, by which it may be gripped and pulled for the full length of a stroke without lifting, the handle being swung up and over at the end of each stroke and brought down and stowed at the other end. The action is shown in FIG. 11.

The dating stamp 30 is secured beneath the base 20 by screws 58 acting against springs 59 so that the printing elements of the dater can be pushed down against the springs when the roll passes. The dating wheels extend through an opening 60 in the base 20 and are accessible for setting inside the casing space when the cover 61 is removed.

As shown in FIGS. 4 and 6, the cover 61 fits in the grooves 62 in the rails. The cover is springy and bent or bowed in the middle, as shown in FIG. 3, so as to positively hold its position along the slots.

The amount printing unit 31 is here shown to include five digit wheels 64 which project up on the upper side through an opening 65 in the base 20 to a height to cooperate with the impression roll. The frame 66 of the unit 31 is secured in an auxiliary base 67 which is secured to the main casing base by the corner screws 67a. The bottom of the auxiliary base 67 is provided with a plurality of holes 68 to receive the outer or lower edges of finger setting wheels 69 which are connected with respective number wheels by gears 70. Friction leaf springs 71 hold the number wheels securely in set position.

The number wheels are visible inside the main casing for setting when the cover is removed but, if desired, the finger wheels 69 may also be marked with numbers around their periphery so that the setting inside can be determined by the position of the finger wheels relative to index marks on the bottom of the auxiliary base. This is simple since a 1 to 1 gear ration is maintained.

A modified form of dater is shown in FIGS. 12 to 18. Here a supplemental base 75 is provided with guide slots for dating strips 76 having numbers embossed thereon, the strips in the middle of their length rising up on raised anvil ramps 77 having the correct elevation to place the numbers thereabove in position to support a ticket pad and have the roll take their impression on the ticket pad. The embossed strips fit frictionally within their longitudinal slots and may be provided with holes for engagement by a pointed tool for pulling them along into proper position for the correct numbers to be exposed. The ramps may be staggered if desired and as shown for greater ease in reading the date. The upper strip may have numbers from 1 to 12 for the month; the next two may have numbers from 0 to 9 each for the days (although the upper will need only 1 to 3 since there are 30 days in a month with one added at times); and the bottom strip will carry numbers for several years, the last two numbers of the year, as 62 for 1962, 63 for 1963, etc.

The simple imprinter may be used without the date and number wheels, the attendant writing in the date and amount. In this case, as shown in FIGS. 19, 20, it may be desirable to use the bottom of the base for writing. It is made plain and smooth and it is only necessary to add clips 80 at one end for holding the ticket pad for writing. The thin dating strips could be used conveniently with the base below them made smooth for writing.

In some cases it may be desirable to mount the imprinter on a permanent base. Such an arrangement is shown in FIG. 21 where the fixed base 85 has the imprinter secured to it by the corner screws, the base being provided with receptacles at the ends to hold a number of ticket pads.

It is thus seen that the invention provides a simple, sturdy, convenient and dependable imprinter which is basically a portable device but which is readily adapted to be placed upon or secured to a fixed support.

While certain embodiments of the invention have been described for purposes of illustration, it is to be understood that there may be various other embodiments and modifications within the general scope of the invention.

We claim:

1. An imprinting machine comprising, in combination: a base; said base including a platen surface; an impression roll mounted for movement over said platen surface; means for mounting a card with printing elements upon said platen surface; other printing elements carried by said base for interaction with said roll; said other printing elements being carried on a flexible strip extending under said card on said platen surface; guide slots provided in said base for said flexible strip; a ramp anvil provided on said base for supporting a portion of said flexible strip above the guide slots with certain of said other printing elements on a level with the printing elements of the card and in a position to be engaged by said roll to make an impression.

2. An imprinting machine as set forth in claim 1 including a plurality of flexible printing strips carried in a plurality of parallel slots; and a plurality of ramp anvils, one for each of said strips, the printing elements of said flexible strips being positioned adjacent each other on said ramp anvils in a selected arrangement.

3. A portable, compact imprinting machine, comprising, in combination: a base; parallel rails secured to said base and provided with longitudinal guide slots; an impression roll having ends mounted for movement along said slots; a handle means disposed externally of said rails and base and pivotally mounted on the ends of said roll, said handle means including parallel side rods pivoted to ends of said roll and spaced apart to fit alongside the external sides of said rails, and a grip bar at ends of said rods spaced from said roll approximately the length of said base, the rods being of such length that when the roll is at one end of the slots and the handle side rods are parallel to the base and disposed externally alongside the rails, the grip bar is disposed opposite said base at the end opposite the roll; and stop means on said base cooperable with said handle side rods to limit movement of said handle means through an arc of approximately 180 degrees above said base.

4. An imprinting machine as stated in claim 3, wherein said base includes a support area for a card with printing elements; said longitudinal guide slots extending in straight parallel lines beyond said support area to position said roll beyond said area; end portions of said guide slots serving as stop means for said roll whereby an imprinting cycle is completed in each direction of movement of the handle.

5. An imprinting machine as stated in claim 3, including settable wheels carried by said base means and extending into said surface area.

6. An imprinting machine comprising, in combination: an elongated main casing having a base means providing an internal platen surface and having side walls provided with parallel, longitudinally extending straight slots for guiding and limiting the stroke of an impression roll from one end of the casing to the other end of the casing; an impression roll having ends movably mounted in said slots with end extensions projecting externally beyond said side walls; a U-shaped handle pivotally connected to the projecting end extensions of said roll, said U-shaped handle having a length and a width to receive within the U-shape said elongated casing when the roll is positioned at one end of the casing; and stop means on side walls of said main casing for limiting movement of said handle to an arc above said platen base and for endwise movement with respect to said slots whereby an imprinting cycle is completed in each direction of movement of the impression roll and handle.

7. A compact, portable imprinting machine for imprinting in each direction of movement of an impression roll comprising, in combination: an elongated base member provided with a platen surface; side walls on said base member provided with longitudinally extending guide slots presenting guide surfaces in selected spaced relation to said platen surface; an imprinting roll movable between said side walls and having roll extensions movable along said guide slots against said guide surfaces; a U-shaped handle means, including parallel side members pivotally connected to said roll extensions and disposed externally of said side walls; a handle member interconnecting adjacent ends of said side members, said side members being spaced apart to pass externally of said side walls and having a length such that said handle member is disposed at one end of said base member when said roll is disposed at the other end of said base member; stop surfaces on said base member cooperable with said side members for limiting movement of said handle means in an arc over said platen surface and in endwise directions parallel to said guide slots whereby movement of said handle means and roll parallel to said base member in one direction completes an imprinting operation and positions said handle member and roll for movement in the opposite direction for completion of a second imprinting operation.

No references cited.

DAVID KLEIN, *Primary Examiner.*
ROBERT E. PULFREY, *Examiner.*